United States Patent
Schipper et al.

(10) Patent No.: US 11,682,122 B2
(45) Date of Patent: Jun. 20, 2023

(54) AUTO-TRACKER CHARACTERIZATION WITH ROBOTICS APPLICATIONS

(71) Applicant: INTELLIJOINT SURGICAL INC., Kitchener (CA)

(72) Inventors: Joseph Arthur Schipper, Kitchener (CA); Justin Aaron Michael, North Vancouver (CA); Andre Novomir Hladio, Waterloo (CA)

(73) Assignee: INTELLIJOINT SURGICAL INC., Kitchener (CA)

( * ) Notice: Subject to any disclaimer, the term of this patent is extended or adjusted under 35 U.S.C. 154(b) by 245 days.

(21) Appl. No.: 17/122,326

(22) Filed: Dec. 15, 2020

(65) Prior Publication Data

US 2021/0183075 A1    Jun. 17, 2021

Related U.S. Application Data

(60) Provisional application No. 62/948,545, filed on Dec. 16, 2019.

(51) Int. Cl.
*G06T 7/73* (2017.01)
*G06T 7/246* (2017.01)

(52) U.S. Cl.
CPC .......... *G06T 7/246* (2017.01); *G06T 7/73* (2017.01); *G06T 2207/10016* (2013.01); *G06T 2207/30004* (2013.01); *G06T 2207/30244* (2013.01)

(58) Field of Classification Search
CPC ... G06T 7/0012; G06T 7/0014; G06T 7/0016; G06T 7/20; G06T 7/246; G06T 7/248; G06T 7/70; G06T 7/73; G06T 7/74; G06T 2207/30204; A61B 34/20; A61B 2034/2046; A61B 2034/2055; A61B 2034/2065
See application file for complete search history.

(56) References Cited

U.S. PATENT DOCUMENTS

2016/0035108 A1*  2/2016  Yu et al. ............. A61B 5/721
                                                              382/131

FOREIGN PATENT DOCUMENTS

CA    3 033 972 A1 *  9/2019  .......... B25J 11/0085

* cited by examiner

*Primary Examiner* — Andrew W Johns

(57) ABSTRACT

Computing devices and methods are provided to automatically characterize a localization system tracker for a procedure. A starting tracker definition is refined until convergence using an iterative process and measured features of the tracker in images provided by a localization system camera. In each iteration, poses are determined from the measured features using a current tracker definition. The current definition is then refined using the poses and an optimization function. Tracker images may be captured passively, when performing other procedure steps. In a robotic context, command trajectories move a robot may be to respective poses where images to characterize the tracker are captured. An updated trajectory may be commanded to optimize convergence, additionally using the measured features at the updated pose in the iterative process. A robot kinematic model may be defined, refining a starting model using tracker poses from the localization system and sensor positions from the robot system.

22 Claims, 6 Drawing Sheets

AUTO-TRACKER CHARACTERIZATION WITH ROBOTICS APPLICATIONS

CROSS-REFERENCE

This application claims the benefit of U.S. Provisional Application No. 62/948,545 filed on Dec. 16, 2019, the entire contents of which are incorporated herein by reference.

FIELD

The present application relates to computing systems and methods and more particularly to automatic tracker characterization, automatically defining a definition to track a pose of a tracker using a camera in a 3D space for use by surgical navigation systems and/or robotic systems during a procedure.

BACKGROUND

Surgical navigation systems and/or robotic systems include capabilities to track objects during a procedure, often in as much as six (6) degrees of freedom. Typically, a tracker is associated with one object in a known relationship such that the pose (position and orientation in up to 6 degrees of freedom) of the tracker is related to the pose of the object. Taking advantage of this relationship, using an optical system comprising a camera during a procedure to track the tracker also tracks the object. Trackers are configured with a specific shape, configuration and/or other features and are manufactured to fine tolerances. Such features are described in a tracker definition (e.g. computer data) for use by a processing unit. When an image of the tracker is received and processed, the tracker definition is fit to the tracker features located in the image to determine the tracker's pose in a three dimensional reference space of the camera. This reference space is registered in the processing unit. The space is often associated with (registered to) a patient anatomy. Relative positions and measurements in the registered space of two or more objects may be determined. Objects may be surgical tools, implants, patient anatomy, etc. Trackers may be used in procedures performed using robotics (whether wholly or partially so performed) as well as in non-robotic (traditional) procedures.

For any number of reasons, a tracker instance (e.g. a specific tracker that is being used) may not conform to its tracker definition. The tracker instance may never have conformed or it may have conformed and no longer conforms. Non-conformance may make fitting operations unworkable or challenging and/or non-conformance may mean measurements are inaccurate. It is therefore desirable to address tracker and tracker definition non-conformance.

SUMMARY

Computing devices and methods are provided to automatically characterize a localization system tracker for a procedure. A starting tracker definition is refined until convergence using an iterative process and measured features of the tracker in images provided by a localization system camera. In each iteration, poses are determined from the measured features using a current tracker definition. The current definition is then refined using the poses and an optimization function. Tracker images may be captured passively, when performing other procedure steps. In a robotic context, command trajectories move a robot may be to respective poses where images to characterize the tracker are captured. An updated trajectory may be commanded to optimize convergence, additionally using the measured features at the updated pose in the iterative process. A robot kinematic model may be defined, refining a starting model using tracker poses from the localization system and sensor positions from the robot system.

DETAILED DESCRIPTION

Automatic Tracker Characterization

Systems and methods for automatic tracker characterization are presented. The advantage of automatic characterization is that a user is not required to explicitly perform a characterization step. In the normal course of using a surgical navigation or robotic system, automatic characterization allows the accuracy of an optical tracking system to be quantified or improved as the surgery progresses. Regular workflow to perform the procedure is performed and the system (e.g. in a background mode) uses information generated for one purpose as part of the workflow in a second manner to automatically characterize the tracker without disruption.

Figure 1:
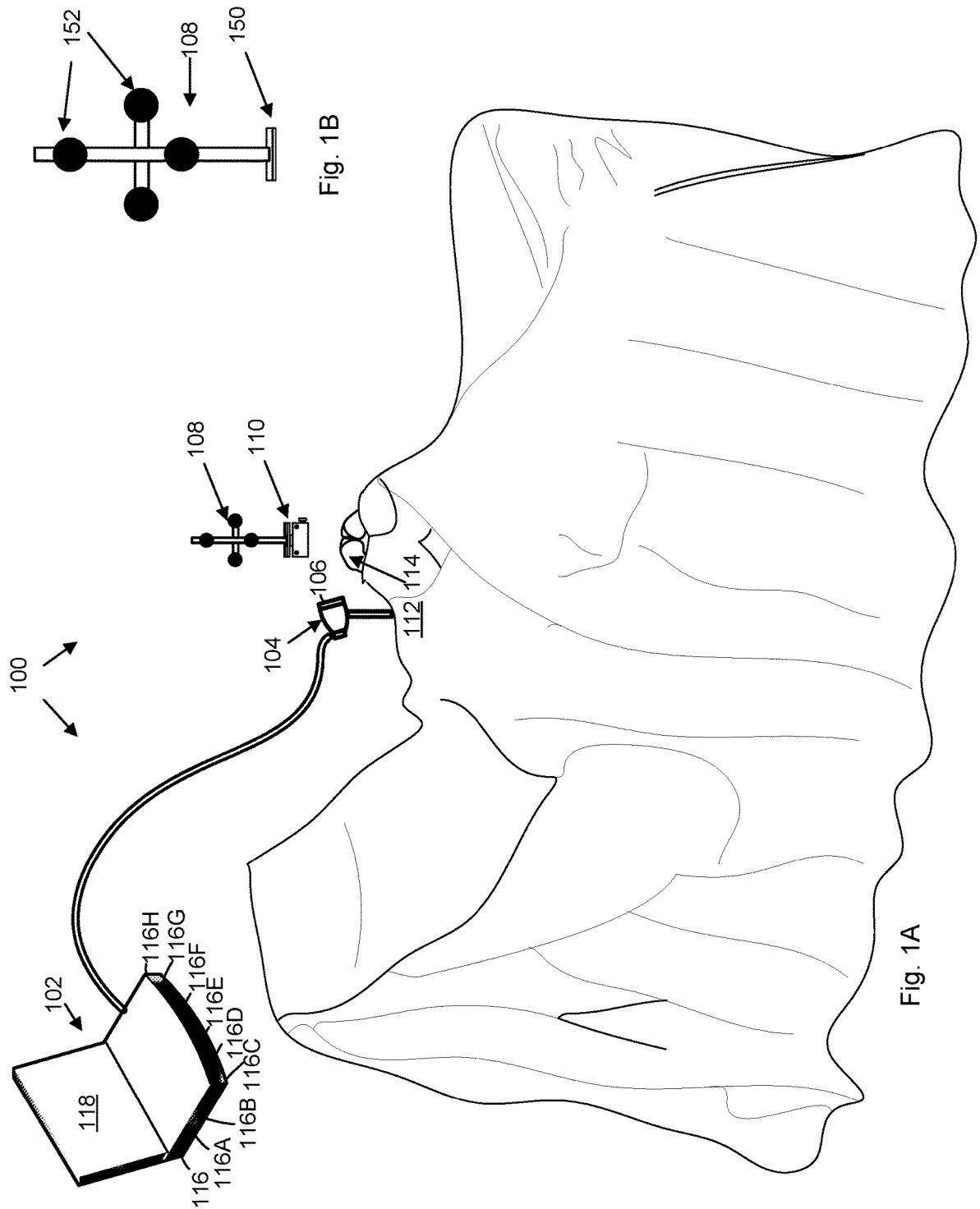
FIG. 1A is an illustration of a surgical navigation system for a procedure including a tracker measured by a localization system in accordance with an example.
FIG. 1B is an enlarged view of a tracker of FIG. 1A.

In each of surgical navigation and a robotic system, there is provided an optical sensor comprising a camera that acquires images of trackers to track associated objects. Optical measurements are provided to a processing unit for processing using a tracker definition. The baseline tracker definition is typically defined prior to performing the procedure and is typically pre-loaded (e.g. into a storage device) coupled for use by the processing unit. FIG. 1A shows a diagram of a computing system 100 configured to performing tracking operations using: a processing unit 102; optical sensor 104 comprising a camera 106; and a tracker 108 coupled to a surgical tool 110 (in this case a cutting guide) as an example. Optical sensor 104 is coupled to patient anatomy 112 to view a surgical site 114. Processing unit 102 is shown as a laptop but other form factors may be used. Processing unit 102 comprises one or more processors (not shown) coupled to one or more storage devices (e.g. memory) 116 and a display device 118. Storage devices 116 store components 116A to perform tracking operations as well as components 116B to perform automatic tracker characterization operations in accordance with an example. Also stored is a baseline tacker definition 116C. Components 116A-116C are shown a software components but they may be hardware components or software (e.g. instructions and/or data) or combinations thereof.

FIG. 1B shows tracker 108 in more detail including base 150 as a plurality of spaced markers 152. Spaced markers 152 are spaced for defining detectable features in an image, defining various planes and to reduce occlusion and enhance location finding in the image. The tracker 108 has a defined overall length, etc. and other features that may be measured in a collection of images of the tracker. Often the individual spaced markers 152 are retro-reflective spheres, for example, configured to reflect IR light for capture by the camera 106. Other configurations and formats may be used. Base 150 (removeably) couples tracker 108 to tool 110 in a specific (spatial) relationship to permit tracking of the tool 110 by tracking the tracker 108. Coupling may be accomplished using various mechanical interfaces.

Detection

The purpose of computer navigation is to generate accurate spatial measurements. The mechanical construction of trackers (e.g. 108) must match the baseline tracker definition (e.g. 116C) expected by the processing unit 102 (e.g. its software components) for the position and orientation (pose) of the tracker 108 to be calculated accurately and precisely In some cases, the mechanical construction of the tracker 108 may be incorrect. This may be due to manufacturing defects or manufacturing tolerance limitations. This may also happen due to user error such as dropping the tracker 108 on the floor. A spherical marker may be unseated, a component bent, etc.

During the use of the system, processing unit 102 may employ tracker characterization in real time (e.g. via component 116B) to indicate to the user that there may be possible mechanical error with the tracker 108. This may be accomplished during the regular use of the system 100. That is, in most surgical navigation applications, there are steps in the procedure where the tracker 108 must be detected prior to the provision of measurements by the navigation system 100 for display to a user. For example, if system 100 is used during a hip replacement surgery (not shown), system 100 can use data collected for the purposes of patient registration, baseline leg position, and baseline hip center, which may provide many different views of the tracker 108. System 100 (e.g. processing unit 102) can use the data collected to calculate a new characterization (e.g. new tracker definition 116D) of the tracker 108. Each of the aforementioned steps of data collection and new tracker definition calculation may be performed prior to presenting clinical measurements to a surgeon. Similar steps may be performed for a knee replacement (as shown in FIG. 1A).

It will be apparent that automatic tracker characterization may be performed during the workflow of a procedure such as in a background manner and use data collected for the workflow such as to perform a clinical measurement. That is, the processing unit may be verifying the tracker accuracy during the procedure, calculating a new tracker definition and comparing to the baseline definition. Portions of the verification processing in the background manner, without interruption of the workflow, may include the data collecting (i.e. acquiring images of the tracker from different angles). Once verification is performed, the workflow may be affected such as to add additional workflow steps or to prohibit the workflow from continuing.

For example, if the new tracker definition 116D is substantially different than the expected definition (baseline tracker definition 116C), a warning could be displayed (e.g. via display 118) to the user indicating that the tracker 108 should be replaced. A metric of the difference between the expected and actual tracker definitions may be referred to as a tracker assessment parameter 116E. The tracker assessment parameter may be compared to a threshold measure of safety, which may be a safety scale.

For the characterization to be accurate, it may be necessary for the camera 106 to view the tracker 108 from many different angles (vantage points), for example to capture the spaced markers 152, sufficiently to make a characterization of the tracker and a new definition therefor. The software (processing unit 102 as configured thereby) may check to ensure that the tracker 108 has been viewed from a sufficiently different number of angles to be sure that the warning or indication is not given in error. This may be done, for example, by saving relative poses (116F) of the camera and tracker in computer memory (e.g. 116), and calculating an angular coverage parameter (116G) based on the saved poses (the angular coverage parameter may be calculated by computing the angular span or maximum angular norm between all saved poses, and updating as new poses are saved). The software (e.g. 116B) may be configured to classify calculated tracker assessment parameters (for example, by magnitude) and give a different warning accordingly. A tracker 108 that has only a small magnitude of error (as indicated by the tracker assessment parameter 116E) may give a warning that the tracker 108 may be used for this case, but should be assessed afterwards. A tracker 108 with a large magnitude of error may be labeled as having a serious defect, and the software may be configured to prevent continued use of that tracker 108, for example, not permitting component 116A to perform tracking (provide measurements). A procedure may be performed using workflow 116H (e.g. a GUI and associated instructions for conducting a procedure) programmed in processing unit 102 that does not progress beyond the tracker characterization phase to or further along a clinical procedure phase.

Correction

Processing unit 102 may be configured to use the new characterization (definition 116D) to update the baseline tracker definition 116C and allow the use of the system 102 to continue (e.g. via the workflow (not shown)). Update may simply mean use the new tracker definition 116D. The baseline tracker definition need not be deleted, or changed per se. If processing unit 102 has updated the baseline tracker definition during a procedure, it may be necessary to recalculate past poses (i.e. poses using an older and less accurate tracker definition) using the new definition. Processing unit 102 may be configured to use previously saved information to recalculate previous clinical parameters such as the anatomic registration, baseline leg length, and baseline hip center (i.e. clinical parameters calculated in accordance with the respective workflow) and update any display for clinical measurements accordingly. Processing unit 102 may alternatively be configured to restart the workflow (e.g. to guide the user to collect new data for the calculation of clinical parameters), or add additional workflow steps (e.g. a probe (not shown) calibration step to update a baseline probe definition).

The GUI may be configured to provide a message to the user indicating that such a correction has been made, or allow the user to decide between using the correction and discontinuing use of the system, etc.

A parameter indicating the amount of correction applied may be calculated, for example, based on the Euclidean norm of the changes to the tracker definition. Such a parameter may be provided for display, numerically or graphically, to a user on a display screen via the GUI.

During operations to detect an issue with a tracker characterization or to correct a tracker characterization (or under both), the processing unit 102 may be able to detect that a correction should be applied, but that more information (e.g. more views) are needed, and add a workflow step to manually capture the required (or a sufficient amount of) data to reliably perform characterization. There may be sufficient views available to the processing unit determine an issue exists—i.e. to detect an error in the tracker characterisation relative to the instance of the tracker being used—but the processing unit may have insufficient information (e.g. not having a sufficient diversity of views) to perform the characterization.

Operations to Perform Tracker Characterization

A tracker 108 may have four or more trackable features (markers 152) which can be seen by a camera 106, and used to compute a six degree-of-freedom position and orientation (pose) of the tracker 108. In order to accurately calculate the pose, the three dimensional coordinates of the trackable features must be known (e.g. via a definition). The definition comprises an X, Y and Z value for each respective marker of the markers 152.

One method of calculating the definition is to know the relative geometry from the 3D (CAD) model used to manufacture the tracker 108. However, if certain processes such as 3D printing, injection moulding, etc., or certain materials such as wood or plastic, etc., are used, it may be impossible to manufacture the tracker 108 within the required tolerances to track precisely. Therefore, a method of characterizing trackers is desirable. One such method uses the monocular camera 106, and an approximate known tracker definition (e.g. 116C), to characterize a tracker accurately.

Described herein are a plurality of iterative operations to determine a tracker characterization. An overall iterative operation determines successive tracker definitions until the overall operations are completed. With each iteration, a starting tracker definition is refined. The overall iterative operations may be completed such as after a pre-set number of iterations or when further iterations won't substantially improve (refine) the tracker definition. That may be determined such as by computing a difference measure between a current tracker definition and an immediately preceding definition and determining whether the difference is within a threshold.

Within each overall iteration are two iterative processes where each may be defined as a respective optimization problem. A first of these two iterative processes determines the pose of the tracker in each of a plurality of views using a current tracker definition and a pose defining optimization process (having a respective function). The second of these two iterative processes uses the poses of the first iterative process and refines the current tracker definition using a tracker defining optimization process (having a respective function). The refined tracker definition is then used in the next iteration of the overall iterative process as the current tracker definition to determine the poses in the views again and refine the current tracker definition with the updated poses. It will be understood that the measured features are reused with each successive current iteration of the overall iterative process, applied using the instance of the current tracker defined that was refined in the immediate previous iteration.

Figure 2:
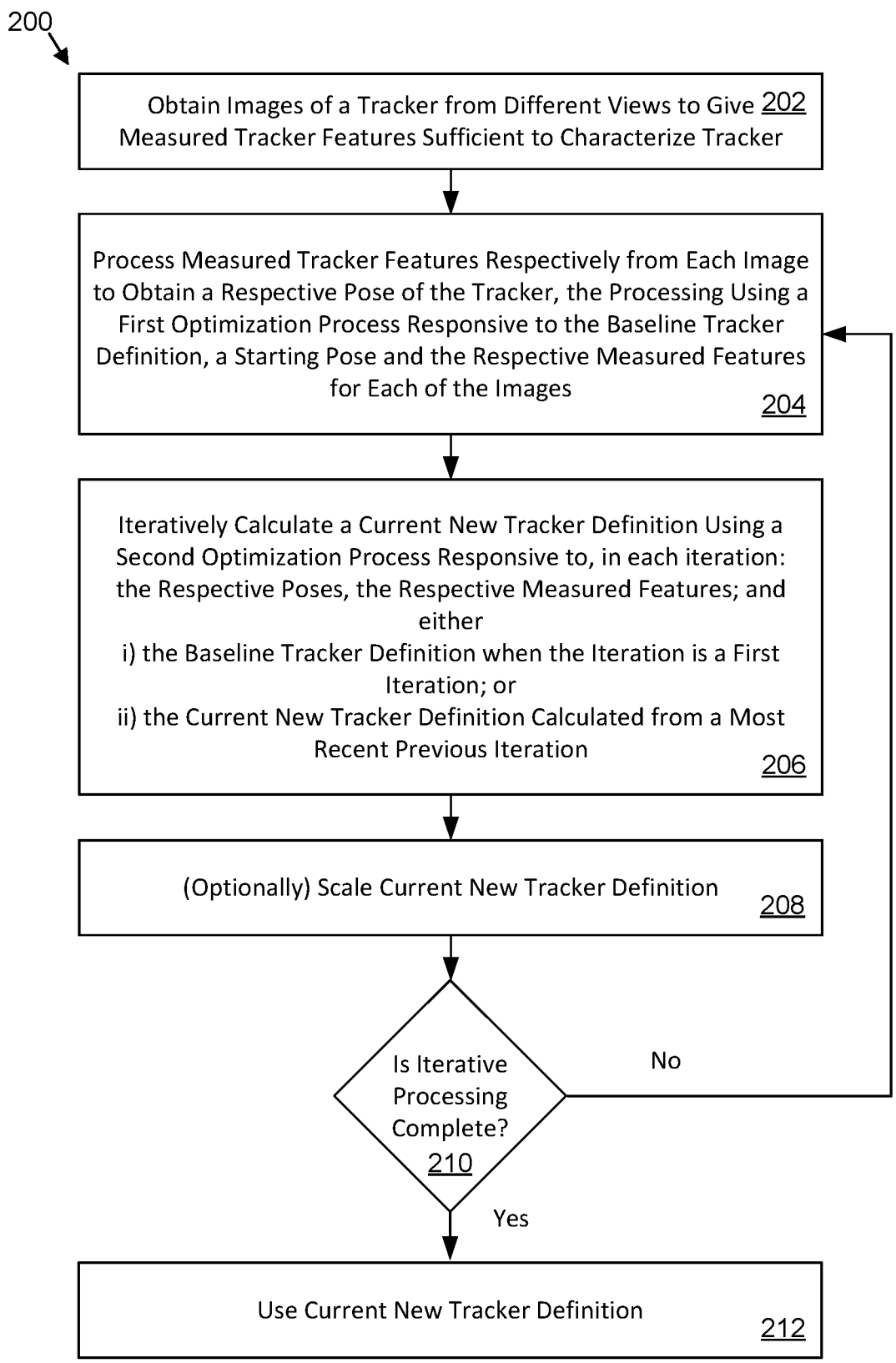
FIG. 2 is a flow chart of tracker characterization operations in accordance with an example.

Reference is made to FIG. 2 showing operations 200. Data is captured with the camera 106, in which the tracker is visible from a variety of orientations, positions, and distances (at 202). The images of the tracker from different the views at a variety of orientations, positions, and distances give measured tracker features sufficient to characterize tracker. This data is collected as data frames, where in each frame, the 2D positions of the trackable features (e.g. the markers 152) are known precisely in the image. An overall iterative process (e.g. steps 204-210 are repeated as applicable) may be used as follows.

At 204 operations solve for the pose of the tracker 108 in each of the images. Operations process the measured tracker features respectively from each image (data frame) to obtain a respective pose of the tracker. The processing uses the pose defining optimization process responsive to a current tracker definition, a starting pose and the respective measured features for each of the images.

Each respective pose solving operation is iterative as described above. For example, determining the respective poses may be processed through conventional means such as through a gradient descent optimization of a first cost function where the first cost function calculates the projected positions of the trackable features 204 transformed by the pose of the current iteration onto the image using a mathematical model of the monocular camera. The projection of features 204 are compared to the 2D positions of those trackable features 204 measured on in the image. This first cost function has six parameters which are optimized (the pose), and a residual vector which is 2N values (for N trackable features) consisting of the horizontal and vertical difference in pixels between the projected positions and the measured positions of trackable features 204. The pose gradient descent optimization requires a starting guess pose, a tracker definition, a mathematical model of the camera, and the measured 2D positions of the trackable features (measured tracker features) in the image. If the iteration is a first iteration, the starting guess pose may be set as the result of a less accurate algorithm, or set as a default starting guess pose. In all subsequent iterations the starting guess pose is set as the result of the pose from a most recent iteration. This first step of the iteration optimizes the pose for each data frame by assuming that the (original) baseline tracker definition 116C is correct if the iteration is a first iteration, or by assuming that the current new tracker definition is correct from a most recent previous iteration.

At 206 operations iteratively calculate an instance of the current tracker definition using a tracker defining optimization process responsive to, in each iteration: the respective poses, the respective measured features; and the current tracker definition calculated from a most recent previous iteration.

For the tracker defining optimization process (the second iterative process within the overall iterative process), a second gradient descent optimization may be used to iteratively calculate the current tracker definition (each may be an iteration of definition 116D) by assuming that the poses for each frame (calculated at 204) are correct in the current iteration. The second cost function of the tracker defining optimization process is similar to the first cost function of the first optimization process of step 204. Using the current tracker definition 116D for the current iteration, the second cost function is calculated for each frame (using the poses calculated in step one, and the feature locations in the image). The second cost function optimizes 3N parameters (for N trackable features), and has a residual vector which is 2MN values (for M frames).

The pose defining optimization process and the tracker defining optimization process above each describe the use of a specific cost function. This is provided as an example cost function implementation, but other implementations which accomplish a similar result are intended to be considered (e.g. where 2D measured feature locations are projected as 3D rays from the camera, and compared in 3D to the expected features positions).

Processing techniques referenced herein are further described in Hartley, R., & Zisserman, A. (2004). Multiple View Geometry in Computer Vision. Cambridge: Cambridge University Press. doi:10.1017/CBO9780511811685 and at www.cambridge.org/core/books/multiple-view-geometry-in-computer-vision/
0B6F289C78B2B23F596CAA76D3D43F7A The tracker defining optimization process (of step 206) may be susceptible to scaling ambiguity, where there is an unknown scale factor which cannot be controlled for. To overcome this ambiguity, a scaling update is performed after each iteration (at 208). This scaling update rescales the optimized tracker definition to have a similar scale parameter to the approximate tracker definition, such as updating to have the same mean distance from the markers to the tracker center of mass. Alternative methods could be used to correct the scaling ambiguity instead of correcting to the scale of the approximate tracker definition. One example of an alternative method is to measure the geometry of a known size, such as using the tracker 108 as a probe and probing two features that are spaced by a known distance.

At 210, a determination is made whether the overall iterative processing to refine the tracker definition is complete (with a loop back to 204 if No and advancement to step 212 if Yes). The respective optimization processes at 204, 206 and optionally the scaling process at 208 may be performed for a set number of iterations (e.g. five iterations). A stopping criteria alternatively be used by calculating the differences in respective current new tracker definitions (respective instances of definition 116D) between each iteration. If the current tracker definition optimized by the current iteration is similar enough to the previous iteration's tracker definition, then the overall optimization is complete. At 212 the current tracker definition is used as described.

It will be understood that at least logically, system 100 comprises components of a localization system primarily responsible to determine localization (location related measurements of the objects) and a surgical navigation system primarily responsible to use the measurements to perform a procedure, displaying clinically relevant measures, providing workflow, etc. for a specific procedure, etc.) Some components such as processing unit 102 may be shared by these (logical) systems. They may have distinct components in other configurations of system 100.

Robot Trajectory Planning

Figure 3A:
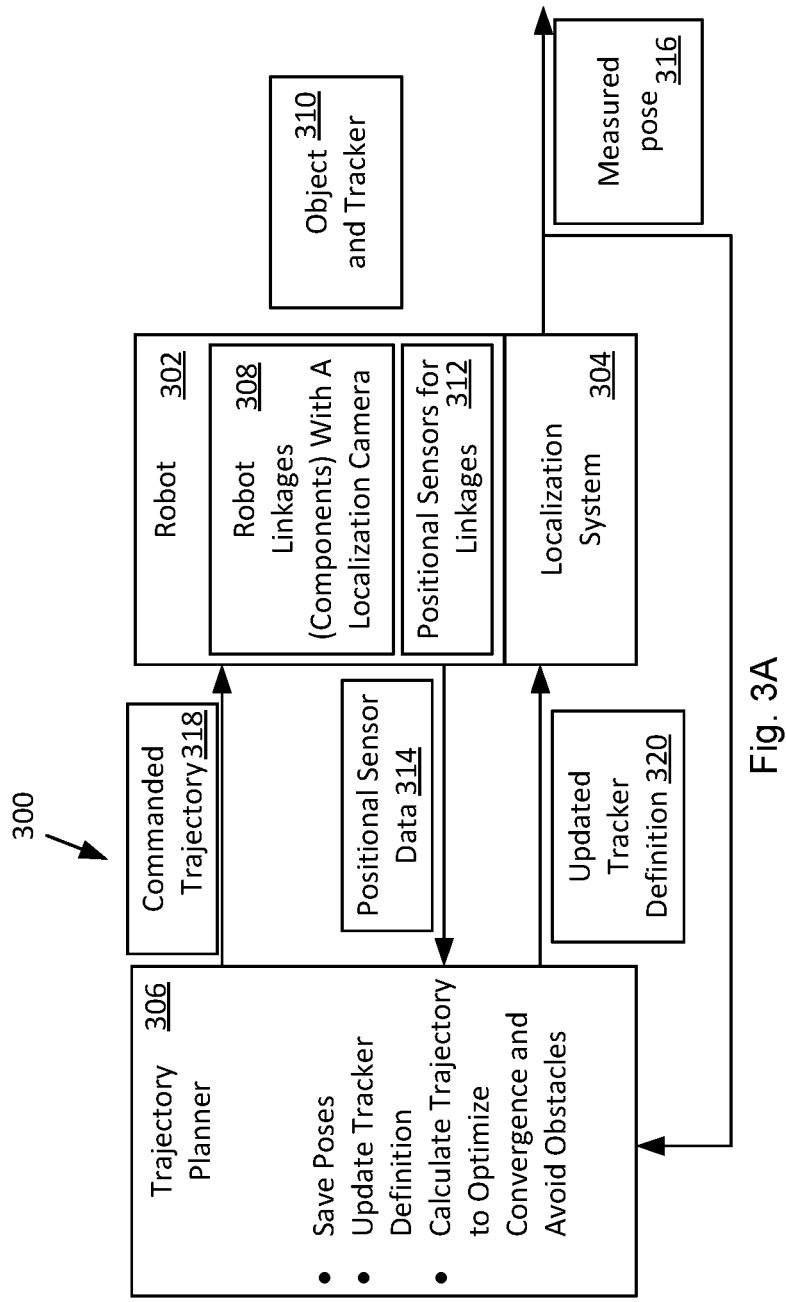
FIG. 3A is a block diagram of a robotic surgery system including a tracker measured by a localization system and a trajectory planning component configured to update a tracker definition in accordance with an example.

As noted, FIG. 1A shows surgical navigation system 100 for a surgical procedure without robotics. FIG. 3A shows a block diagram of a robotic system 300 and FIG. 3B an illustration of system 300 having:
  robotic functionality provided by a robot (itself a system of one or more components 302 including linkages 308 and an end effector tool 302A (FIG. 3B)); and
  localization functionality provided by a localization system (e.g. one or more components 304).

Figure 3B:
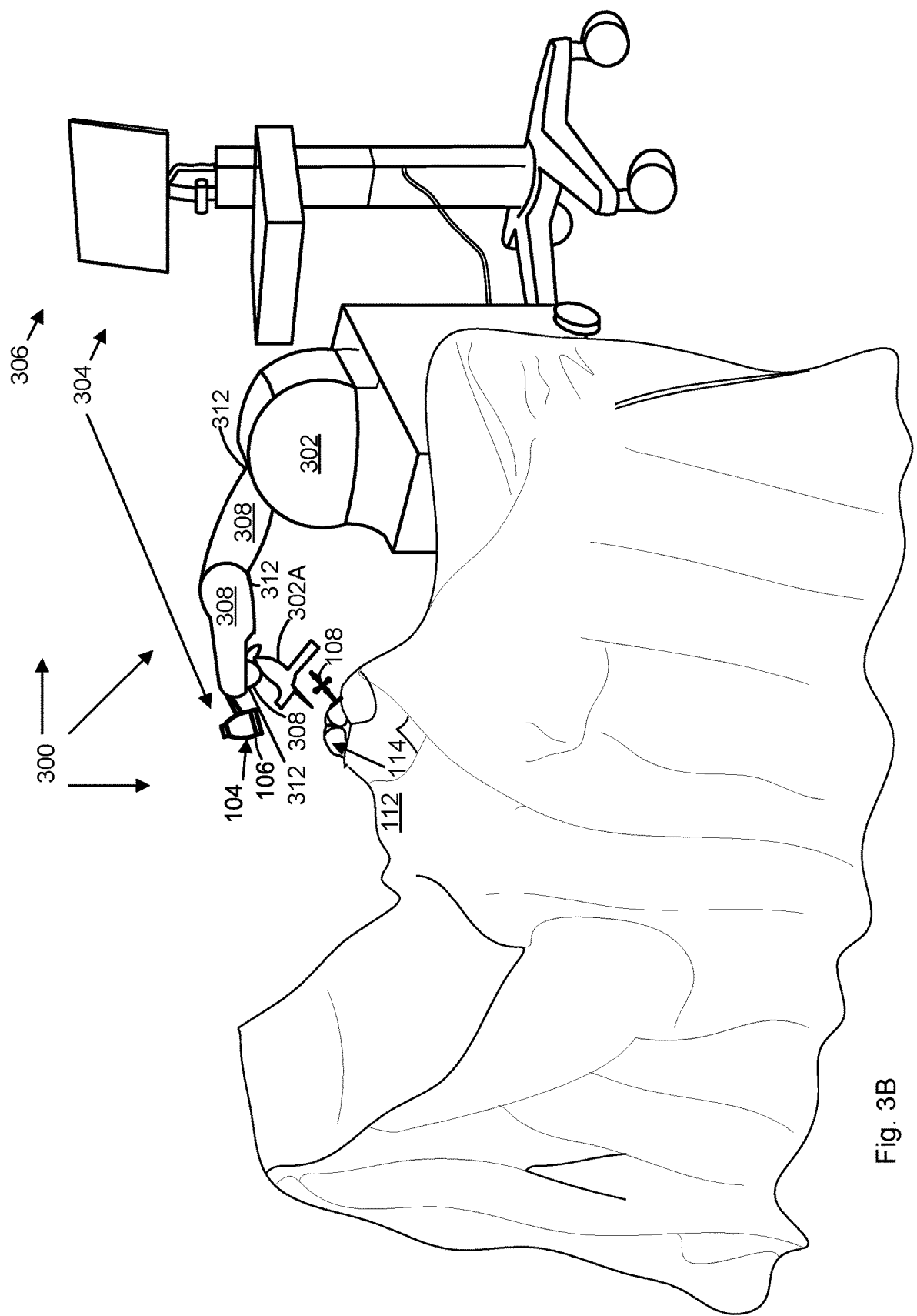
FIG. 3B is an illustration of the system of FIG. 3A showing a camera of the localization system coupled to a robot.

Also shown is a trajectory planner (e.g. comprising one or more components 306 (hardware and/or software)) such as for commanding the operation of the robot to control operation of its linkages and effectors, etc. FIG. 3B shows a camera 106 of the localization system 304 coupled to a linkage 308 of the robot.

Each of 302, 304 and 306 may comprise respective processing units or may share the same. Localization system 304 is similar to that of FIG. 1 and includes an optical sensor 104 with a localization camera 106, with which to capture images of poses of a target 108 at a site 114 for a patient 112. In FIGS. 3A and 3B, components of the localization system 304, such as the optical sensor comprising the camera, may be coupled to a robot component (e.g. e.g. one of linkages 308 as shown in FIG. 3B) and the tracker may be coupled to an object (e.g. 310 or 112). It is understood that the tracker may be on the robot component and the camera on the object. The tracker has a known (a priori) tracker definition (e.g. definition 116C) such as for use by localization system 304. Positional sensors 312 may provide positional sensor data 314 to trajectory planner 306 for the positions of the linkages 308.

Trajectory planner 306 may be incorporated within a system for providing robotic surgery. Such a system is similar to the surgical navigation system of FIG. 1, in that it has programming (functionality) for a specific procedure (e.g. it provides a surgical workflow to achieving surgical goals related to spatial alignment). The trajectory planner 306 is distinct from the navigation system of FIG. 1 in that the navigation system does not require commanded trajectories; however, other functions of the trajectory planner 306 are similar to those provided by the navigation system. In the present example, trajectory planner 306 is configured to perform automatic tracker characterization, similar to that described with reference to FIG. 1.

Automatic tracker characterization relies on sufficient pose data 316 from a variety of vantage points of the tracker 310 by the camera of system 304. The robot may be commanded to execute a trajectory (command trajectory 318) to generate such pose data 316 for the purposes of tracker characterization.

Robotic system 300 may perform tracker characterization similarly to system 100. In FIGS. 3A and 3B robotic system 300 comprises a software implemented trajectory planner 306. The trajectory planner 306 may command an initial trajectory to the robot 302. The associated localization system 304 may measure the resulting tracker pose based on an initial tracker definition (e.g. like 116C to be automatically updated as 116D). The measured pose 316 may be fed back to a component of the trajectory planner similar to component 116B to save measured poses, update the tracker definition (as described in the operations with FIG. 1), and calculate an updated trajectory 318. The updated tracker definition 320 may be provided to localization system 304.

Figure 4:
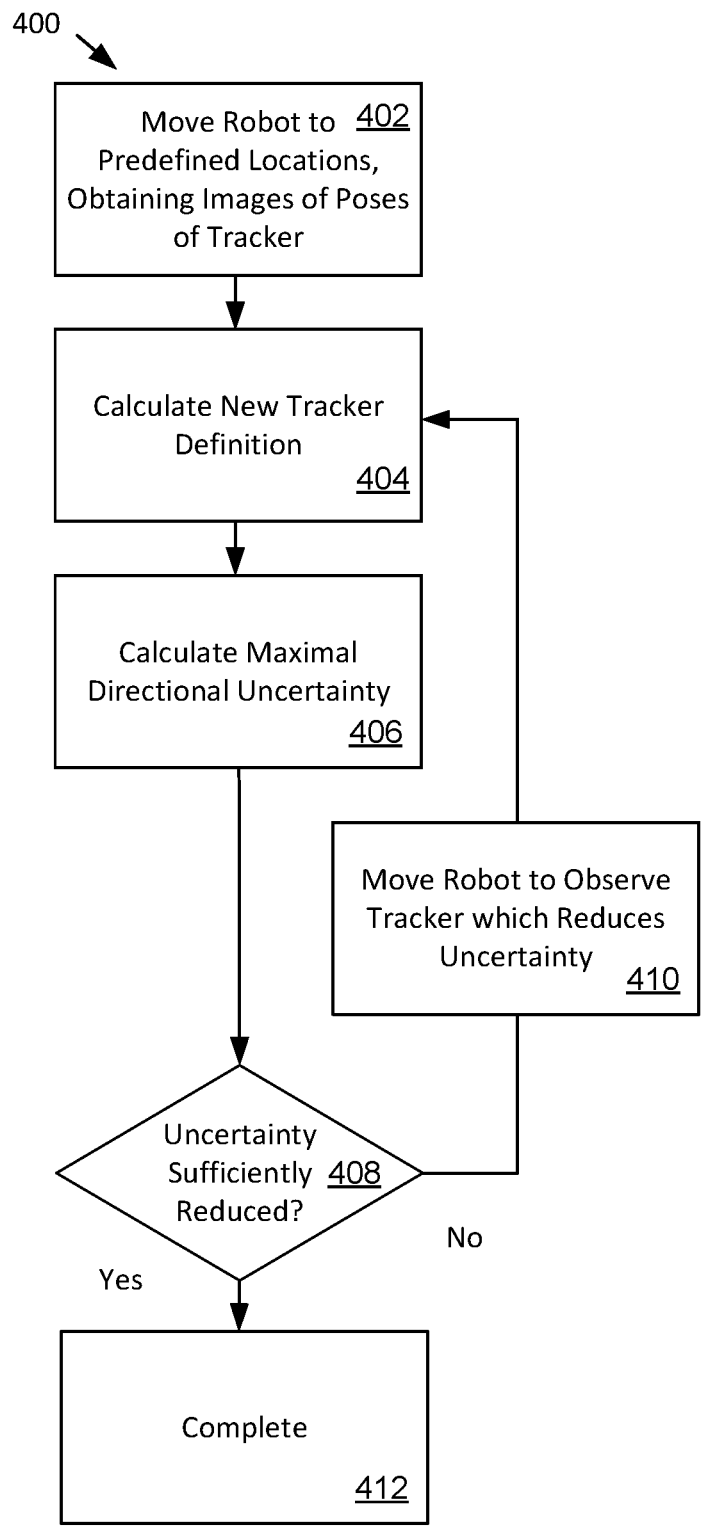
FIGS. 4 and 5 are flow charts of operations in in accordance with an example.

However, system 300 may perform differently as compared to system 100. As previously noted, tracker definition convergence means that further iterations of tracker characterization do not yield any improvements in accuracy of the tracker definition (or the improvements are below a threshold of significance for the particular application). Trajectory planner 306 may calculate updated trajectories (instances of 318) to optimize, at least in part, tracker definition convergence. Trajectory planner 306 may generate command trajectories to position the robot such that one or more additional views showing the tracker are obtained to use to calculate poses for use to make the tracker characterization. Reference is directed to FIG. 4 and operations 400. At 402, operations command the robot to move to predefined locations where images are captured of the tracker (capturing poses). At 404, a new tracker definition (such as described with reference to FIG. 2) is calculated until convergence using these poses.

At 406, operations calculate a direction of maximal uncertainty, which is one implementation of calculating a trajectory (of the robot) to optimize convergence of the tracker definition. At 408, a decision is made whether the tracker definition is optimized, using the maximal uncertainty measure of 406. If yes, operations are complete and the current tracker definition is used. If not, via branch to 410, operations move the robot to observe the tracker to reduce directional uncertainty (i.e. to drive toward convergence) such as is described further below.

The commanded trajectories 318 may be further calculated to avoid obstacles or other undesirable locations in the robotic system workspace. For example, an undesirable location may be a singularity in the robot's kinematics, which may be calculated based on sensing the robot's configuration (e.g. via motor encoders at the robot's joints). A singularity is a configuration of the robot where controllable degrees of freedom are lost (or have some performance limitation). As an example, a robotic arm or linkage may have three joints A, B, C (e.g. depicted as "]----A-----B-----C----"). Joint A may rotate around a Z axis, joint B rotate around a X axis, and joint C rotate around a Y axis. Should joint B rotates 90 degrees, then joint A will then face to rotate around the Y axis (like joint C), and there will be no way to rotate the arm around the Z axis. Singularities may also be introduced when joints have rotational limits (rotating partially (less than 360°). The robotic arm may be modeled with a kinematic model that comprises definitions for each of the linkages and joints, including, for example, a base of the robot to which the robotic arm is coupled. The kinematic model may include definitions for one or more end effectors that may be coupled to the robotic arm (e.g. tools etc.) The definitions may include specific component size (e.g. length, width, height, etc. and/or volume parameters) and joint range of motion data parameters etc.

The kinematic model configured using the respective definitions for the robot base, linkages and joints and any end effector coupled to the arm may be used to determine a pose of the robot arm (and optionally any of its components that are modelled) and any end effector coupled to the arm. The pose may be relative to or in a coordinate frame of the robot. Techniques may be used to relate the pose to a coordinate frame of a patient, a camera, etc. such as for making clinical measurement and/or interacting with the patient. Operations to define a kinematic model are described below is Robotic Sensor Fusion. The kinematic model may be configured to determine robot singularities.

Directional uncertainty in the tracker definition may be calculated within the trajectory planning module using the saved poses and current tracker definition. In one example, the directional uncertainty may be calculated as the direction of a pre-defined magnitude of error added to the tracker definition which minimizes the motion of projected features of the tracker for each of the saved poses (e.g. considering only a single data frame, a specific feature of the tracker definition may be moved towards the camera by 1 mm such that the projection of this feature is identical to the projection of the feature in the original location). This may be implemented using the partial derivatives (Jacobian Matrix) of the projected features with respect to the tracker definition to calculate the direction of change in tracker definition which minimizes the change in projected feature locations. The trajectory planning module may update the trajectory at least in part based on directional uncertainty in the current tracker definition. The trajectory planning module may update the trajectory to improve or optimize the speed of tracker characterization. For example, an estimated time of characterization metric may be computed, and used during trajectory calculation. The estimated time of characterization metric may consider robot dynamics and kinematics (e.g. dynamics influence how fast the robot is able to move to a plurality of waypoints, defining the desired vantage points). Robotic Sensor Fusion A robotic system may not have an exact characterization for the end effector movement. That is, the system may know an imprecise kinematic model of the robot (i.e. information about joints and linkages, and expected values, but not have information about exact lengths, or the relationships between joint motions and encoder sensor readings). Encoded sensor readings comprise signals from robot components that may provide positional information for such components, for example, for brushless motors, etc. Without this information, the system would need more input, such as the pose from a reference tracker from an optical tracking system, to determine the precise location of the end effector. This would constrain the system to only be able to operate while the reference tracker was in the field of view of the camera.

It may be advantageous to calculate the pose of a robot (including its end effector) based on encoded sensor readings (e.g. positional sensor data 314). To enable this, encoded sensor readings must be received by a precisely known kinematic model of the robot (implemented (not shown) in software such as in planner 306, for example, as a function whose input is encoded sensor readings, and output being a pose of the robot as determined from the robot's positional sensor data, which may be contrasted to the measured pose data 316).

Figure 5:
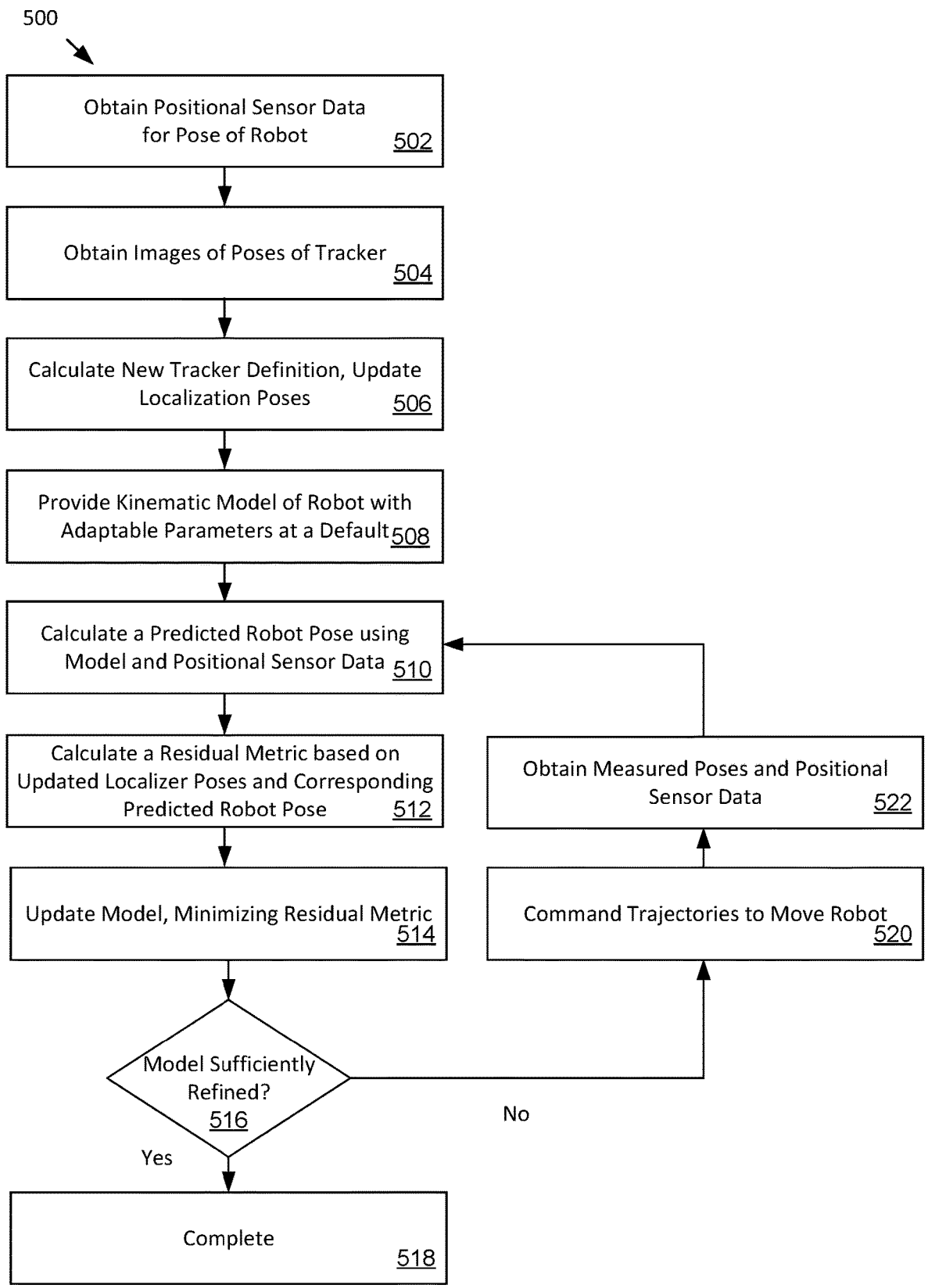

Reference is directed to FIG. 5 and operations 500. In one embodiment, a system comprising a coupled localization system and robotic system (wherein the kinematic model of the robotic system is initially imprecisely known) performs the following. At 502, operations receive encoded sensor readings (positional sensor data 314 from sensors 312 of the robot system 302).

At 504, operations receive measured pose data 316 from localization system 304. At 506, operations update the tracker definition 320 and update the localizer poses using the updated definition 320 and the measured pose data 316. At 508, operations provide a kinematic model (to model poses of linkages) of the robot with adaptable parameters, starting with default parameters.

At 510, operations calculate a predicted robot pose based on the kinematic model and the encoded sensor readings.

At 512, operations calculate a residual metric based on updated localizer poses and corresponding predicted robot poses.

At 514, operations update the kinematic model parameters to minimize the residual metric.

At 516 operations determine whether the model is sufficiently refined (e.g. a residual error threshold is met) and if yes, complete at 518. If no, via branch to 520, operations iterate through steps 520, 522, 510, 512, 514 and 516, moving the robot, obtaining new measurements (encoded sensor readings, localizer poses) and performing calculations and updating the model responsive to the new measurements until a residual error threshold is met.

It is noted that it may be simpler for the tracker to be stationary relative to the robot base (i.e. the coordinate frame of the robot) during the process of characterizing the kinematic model of the robot. Alternatively, the motion of the object (and tracker attached thereto) relative to the base of the robot may be estimated and used to calculate the residual metric based on the updated localizer poses and corresponding predicted robot poses. The predicted robot pose, based on for example motor encoders, may be the location of the robotic end effector relative to the robot base (coordinate frame), whereas the measured pose may be the location of the object relative to the localization system (coordinate frame), wherein one component of the localization system is coupled to the robot (e.g. camera or tracker), but the other component not (i.e. the component coupled to the object).

Estimation of the pose of the object relative to the robot base may be performed, using motion estimation techniques. Characterization calculations may subtract or factor out the motion of the object from the measured pose, such that the resulting kinematic model characterization is of the robotic system irrespective of the object (i.e. the end effector position relative to the robot base).

If the localizer poses are perfectly known (for practical purposes), there may be no need to update the tracker definition and step 506 may be omitted.

The kinematic model parameters may be updated through a gradient descent optimization using a cost function receiving a series of encoder values, localizer poses and a kinematic model (i.e. with known joint types and relative relationships, but with unknown coefficients). The cost function may calculate a residual vector corresponding to the difference between the expected robot end effector position, calculated from the kinematic model and the kinematic model parameters of the current iteration and the sensor data, and the measured position of the robot end effector from the localizer poses. The gradient descent may be provided with a starting kinematic model parameter guess using expected values obtained from the robot kinematic design. In some instances, the input sensor data (i.e. encoder values) may not be time-synchronized with the localizer poses (e.g. localizer poses may be provided every 30 milliseconds, and sensor data provided every 2 milliseconds). In such instances, the system may perform sensor filtering to time-synchronize the input data.

A system comprising coupled robotic and localization subsystems, in which the kinematic model of the robot is known precisely enough for commanding motions based on encoded sensor readings, has many benefits. For example, such a system could enable:

Tolerance to line of sight or other disruptions to a surgical navigation/localization system coupled to the robot;

Cooperative trajectories, for example, where an object (with tracker attached thereto) is moving, the robotic system may be programmed to move the robot (motions commanded based on a precisely known kinematic model of the robot) to maintain certain viewing perspectives of the tracker. Similarly, a robot whose pose can be known precisely may be configured to move during surgery to avoid tracker self-occlusion. This is when part of a tracker obscures itself (e.g. one marker on top of another). During a surgery, the tracker may be currently tracking, but may be moving on a trajectory which will move it to a position where it will self-occlude. The robot may move to a new position which will avoid this potential self-occlusion. That is, the system is actively detection and mitigating potential risks of self-occlusion, rather than reaction to occurrences of self-occlusion. This may provide a more continuous user experience.

It is noted that during any line of sight disruption, even with a precise kinematic model of the robot, the relative pose between the robot (including its end effector) and the object to which the tracker is attached may not be measurable. If the object is not moving, or can be caused to stop moving, then the system may treat the last measured pose of the object as its current pose. Alternatively, the motion of the object may be extrapolated, and the extrapolated pose of the object may be treated as the current pose. This assumption may be valid for a certain time duration, after which the confidence in the extrapolated position of the object is low. Alternatively, during disrupted localization measurements, the system may enter a mode in which the robot moves according to its own encoded sensor readings and kinematic model and performs safe motions such as:

returning (slowly) to a home position implementing slow trajectories to contact the object or other objects and determine its pose based on contact sensors on the robot (e.g. a force-torque sensor coupled to the robotic end effector, measurements of joint torques, etc). for example, the robot may be commanded to contact 3 or more points on an object, and those points may be mapped to a 3D model of the object, available in memory on coupled computing system. In another example, the compliance (stiffness) of the object that the robot contacts may be sensed and used to determine properties and/or classify the object that was contacted (e.g. if the robot touches something soft, then it may be classified as human soft tissue).

Implementing a trajectory to seek to re-establish localization (e.g. the trajectory programmed to search a 3D space for the tracker or other trackers or localizable components)

In addition to computing device aspects, a person of ordinary skill will understand that computer program product aspects are disclosed, where instructions are stored in a non-transient storage device (e.g. a memory, CD-ROM, DVD-ROM, disc, etc.) to configure a computing device to perform any of the method aspects stored herein.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise" and "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise.

Features, integers characteristics, compounds, chemical moieties or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

The invention claimed is:

1. A method to perform tracker characterization, the method comprising:
receiving, at a processing unit from a camera of a localization system, a plurality of images of a tracker, wherein the images include a plurality of measured tracker features with which to characterize the tracker and wherein a baseline tracker definition, accessible to the processing unit, specifies baseline tracker features to characterize the tracker;
determining a second tracker definition for the tracker using the measured tracker features in accordance with an iterative process to refine the second tracker definition in successive current iterations of the iterative process, each of the successive current iterations: calculating current poses of the tracker using the measured tracker features and a current instance of the second tracker definition; and refining the current instance of the second tracker definition using the current poses; and
using the second tracker definition in the performance of a procedure.

2. The method of claim 1, wherein the plurality of images are generated by the camera during a use of the tracker to collect data for the procedure other than to perform tracker characterization.

3. The method of claim 2, wherein the use of the tracker to collect data comprises any one or more of:
performing a registration using the tracker;
performing a baseline measure of a patient anatomy; or
performing workflow of the procedure to determine a clinical measurement.

4. The method of claim 1, wherein determining the second tracker definition comprises:
iteratively, for each current instance of the iterative process:
respectively processing the plurality of images to determine the current poses of the tracker in each of the images; and
refining the second tracker definition using a tracker defining optimization process responsive to the current poses and the current instance of the second tracker definition, the optimization process using the baseline tracker definition in a first iteration.

5. The method of claim 4, wherein the tracker defining optimization process comprises a gradient descent optimization process.

6. The method of claim 4, wherein respectively processing the plurality of images to determine the current poses uses a pose defining optimization process.

7. The method of claim 4, wherein the second tracker definition is iteratively refined in accordance with either 1) a predetermined count of iterations; or 2) a convergence test where the second tracker definition is within a threshold of a previous iteration of the second tracker definition.

8. The method of claim 4 comprising scaling the second tracker definition at each iteration to have a similar scale parameter to a pre-set scale.

9. The method of claim 1, wherein the step of determining the second tracker definition is performed in a background manner, without interrupting a workflow of the procedure.

10. The method of claim 1, wherein using the second tracker definition comprises determining whether or not to perform further steps of the procedure.

11. The method of claim 1 comprising:
computing a tracker assessment parameter comparing the second tracker definition and first tracker definition and, at least one of:
displaying the tracker assessment parameter numerically or graphically;
providing a warning; and
stopping performing the procedure.

12. The method of claim 1 comprising verifying that the plurality of images represent the tracker from a different number of angles to accurately characterize the tracker; and collecting at least one additional image for the plurality of images.

13. The method of claim 12 comprising calculating an angular coverage measure using the plurality of images.

14. The method of claim 1, wherein the tracker features comprise a plurality of markers, wherein the baseline tracker definition is responsive to a baseline configuration of the plurality of markers.

15. The method of claim 1, wherein the method is performed by a trajectory planner component of a robotic system.

16. A method to perform tracker characterization, the method comprising:
determining, at a processing unit, and communicating a plurality of respective trajectories to command movement of a robot to respective poses, the robot comprising a plurality of connected linkages and an effector at a distal end of the connected linkages, one of the linkages coupled to either a camera or a tracker of a localization system and wherein an object has coupled thereto the other of the camera and the tracker;
receiving, at the processing unit from the camera, respective images of the tracker for each of the respective poses of the robot, each of the respective images comprising a plurality of measured tracker features with which to characterize the tracker and wherein a baseline tracker definition, accessible to the processing unit, specifies baseline tracker features to characterize the tracker;
determining a second tracker definition for the tracker using the measured tracker features in accordance with an iterative process to refine the second tracker definition in successive current iterations of the iterative process, wherein each of the successive current iterations: calculates current poses in the respective images of the tracker using the measured tracker features and a current tracker definition; and refines the current tracker definition using the current poses in accordance with an optimization function; and
using the second tracker definition in the performance of a procedure.

17. The method of claim 16, wherein the iterative process refines the second tracker definition through a convergence such that further iterations fail to provide an improvement in the second tracker definition or where any improvement is below a threshold of significance.

18. The method of claim 17 comprising:
determining and communicating an updated trajectory to the robot to command movement to an updated pose to optimize the convergence;
receiving an updated image comprising measured features of the tracker relative to the updated pose; and
additionally using the measured features of the updated image when calculating the current poses and when refining the second tracker definition.

19. The method of claim 18 comprising calculating a direction of maximal uncertainty and using the maximal uncertainty to determine the updated trajectory.

20. The method of claim 18, wherein the respective trajectories and the updated trajectory are calculated to avoid obstacles and robot singularities.

21. The method of claim 18 comprising optimizing a time to complete the tracker characterization, defining the respective trajectories and the updated trajectory in response to robot dynamics and kinematics to command movement of the robot to the respective poses and the updated pose which minimizes a time taken to move the robot linkages.

22. The method of claim 16 comprising determining a directional uncertainty.

\* \* \* \* \*